United States Patent
Fevre et al.

(10) Patent No.: US 11,919,564 B2
(45) Date of Patent: Mar. 5, 2024

(54) STEERING COLUMN SLEEVE COMPRISING A SYSTEM FOR ADJUSTING A RELATIVE POSITION BETWEEN TWO TUBES

(71) Applicant: Robert Bosch Automotive Steering Vendome, Vendome (FR)

(72) Inventors: Laurent Fevre, Saint Sulpice (FR); Eddy Dupont, Cloyes sur le Loir (FR)

(73) Assignee: Robert Bosch Automotive Steering Vendome, Vendome (FR)

(*) Notice: Subject to any disclaimer, the term of this patent is extended or adjusted under 35 U.S.C. 154(b) by 33 days.

(21) Appl. No.: 17/777,849

(22) PCT Filed: Nov. 20, 2020

(86) PCT No.: PCT/EP2020/082954
§ 371 (c)(1),
(2) Date: May 18, 2022

(87) PCT Pub. No.: WO2021/099599
PCT Pub. Date: May 27, 2021

(65) Prior Publication Data
US 2022/0410962 A1 Dec. 29, 2022

(30) Foreign Application Priority Data
Nov. 22, 2019 (FR) .................................. 1913140
Dec. 10, 2019 (FR) .................................. 1914104

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC .......... B62D 1/181; B62D 1/184; B62D 1/185
See application file for complete search history.

(56) References Cited

U.S. PATENT DOCUMENTS 8,161,839 B2 * 4/2012 Warashina ............. B62D 1/181
74/493
8,316,737 B2 * 11/2012 Bertet .................... B62D 1/184
74/495

(Continued)

FOREIGN PATENT DOCUMENTS

DE 4205929 A1 * 9/1992
WO 2017/140526 A1 8/2017

OTHER PUBLICATIONS

International Search Report corresponding to International Patent Application No. PCT/EP2020/082954, dated Feb. 12, 2021 (5 pages).

*Primary Examiner* — Laura Freedman
(74) *Attorney, Agent, or Firm* — Maginot, Moore & Beck LLP (57) ABSTRACT

A steering column sleeve includes (i) a translationally movable outer tube and inner tube, and (ii) an adjusting system for adjusting the relative position of the tubes. The adjusting system includes a screw for adjusting the axial position of the two elements. The adjusting system further includes an adjusting device for adjusting a resistance force opposing the relative movement between the tubes. The adjusting device has a friction pad and a clamping surface against which the friction pad moves between operating and adjustment positions. The adjusting system also includes a kinematic chain so that, beyond a threshold resistance torque transmitted by the screw to a single motor that it drives, its torque is transmitted to the adjusting device so as to move the friction pad from its operating position to its adjustment position.

14 Claims, 6 Drawing Sheets

(56) References Cited

U.S. PATENT DOCUMENTS

| | | | | |
|---|---|---|---|---|
| 9,260,130 B2* | 2/2016 | Mizuno | ................... | B62D 1/187 |
| 9,487,228 B2* | 11/2016 | Fevre | ..................... | B62D 1/181 |
| 10,189,496 B2* | 1/2019 | King | ..................... | B62D 1/184 |
| 10,611,395 B2* | 4/2020 | Huber | ................... | B62D 1/184 |
| 10,933,902 B2* | 3/2021 | Specht | ................... | B62D 1/181 |
| 11,358,626 B2* | 6/2022 | Ryne | ..................... | B62D 1/181 |
| 11,697,449 B2* | 7/2023 | Ryne | ..................... | B62D 1/187 |
| | | | | 74/484 R |
| 2022/0402540 A1* | 12/2022 | Fevre | ..................... | B62D 1/181 |
| 2023/0018690 A1* | 1/2023 | Fevre | ..................... | F16C 19/14 |
| 2023/0249738 A1* | 8/2023 | Ancelin | ................ | B62D 1/181 |
| | | | | 74/493 |

\* cited by examiner

STEERING COLUMN SLEEVE COMPRISING A SYSTEM FOR ADJUSTING A RELATIVE POSITION BETWEEN TWO TUBES

This application is a 35 U.S.C. § 371 National Stage Application of PCT/EP2020/082954, filed on Nov. 20, 2020, which claims the benefit of priority to (i) Serial No. FR 1913140, filed on Nov. 22, 2019 in France, and (ii) Serial No. FR 1914104, filed on Dec. 10, 2019 filed in France, the disclosures of which are incorporated herein by reference in their entirety.

The disclosure relates in general to the technical field of steering columns and systems for adjusting a relative axial position between two elements in translation.

The disclosure relates more specifically to a steering column sleeve comprising a system for adjusting a relative axial position between two elements consisting of an outer tube and an inner tube, able to move translationally one with respect to the other, so as to allow adjustment of the reach (depthwise position) of a steering wheel of a vehicle, such as an automobile.

BACKGROUND

Automobile steering wheels are very often adjustable for reach and rake thanks to an adjusting system operated by a user of the vehicle. Such an adjusting system generally comprises an adjusting mechanism situated on a sleeve of a steering column of the automobile and may be manual or electric. In the case of an electric system, an assembly consisting of reduction gear involving a worm, associated with a screw-nut system, converts the rotational movement of an electric motor into a translational movement, said electric motor then being rated in order to achieve the desired rate of adjustment given the frictional forces present in the sleeve of the steering column and in the kinematic chain more generally.

Reach adjustment is generally performed by means of a telescopic system involving two tubes: an outer tube and an inner tube which is configured to move translationally inside the outer tube, said outer tube comprising a pressing mechanism such as a screw which applies force to an inner tube. This force is needed in order to cover the operational clearance and ensure the linkage a minimum of stiffness. The electric motor is then rated to achieve the desired rate of adjustment given these forces.

Such pressing mechanisms generally comprise a screw, screwed into a body and secured to the outer tube, and which is equipped with an interface allowing it to apply a torque and/or an angle and a friction pad rubbing on the inner tube. Once the various components of the mechanism have been installed inside the body, a clamping procedure that combines torque and angle makes it possible to obtain a compression force of a desired predetermined value which determines the pressing force applied by the friction pad to the inner tube. Such a procedure for adjusting this predetermined value is performed once at the factory during the manufacture of the steering column. Thereafter, during the phases of steering wheel position adjustment performed by a user, the force required to perform this reach adjustment, whether this is done manually or electrically, needs to overcome this predetermined force of relative clamping of the two tubes, corresponding to the clamping of the friction pad against the inner tube, so that one of the tubes can be moved translationally relative to the other.

In the case of vehicles equipped with an autonomous driving system, the manufacturers may need to increase the adjustment travel so as to be able to free up more space for the driver of the vehicle during phases of driving in which control of the vehicle is handled automatically. These new adjustment travels may typically be two to five times greater than in the case of a conventional vehicle. With a conventional adjusting mechanism, that means that the adjusting times will be lengthened in the same proportion. In order to avoid this, the manufacturers are seeking to maintain similar adjusting times to conventional vehicles by increasing the rate of adjustment. However, such a constraint leads to the overrating of the motors, leading to additional costs, weight and electrical energy consumption.

There is therefore a need to find a solution that makes it possible to reduce the force of sliding of the two telescopic tubes during the phases of adjustment.

In order to alleviate such constraints, the person skilled in the art has developed a number of diverse and varied solutions for electrically controlling the movement of a friction pad from a service position, in which a predetermined service pressure is applied by the friction pad to the inner tube, and an adjusting position, in which a reduced adjusting pressure, namely a pressure lower than the service pressure, is applied by the friction pad so that, in this adjusting position, the resistive force opposing the translational movement of the outer and inner tubes of the steering column sleeve is reduced.

These solutions known at the present time are all bulky and their mechanisms are complex. Furthermore, such a solution entails the use of a friction pad adjusting system that needs to be perfectly coordinated with the adjusting of an adjusting screw that adjusts the relative axial position between the two telescopic tubes. Such synchronization can be achieved through perfectly synchronized electronic control of the electric motors used for each of the adjustments, namely, on the one hand, of the adjusting screw and, on the other hand, of the pressing mechanisms. However, such a configuration results in significant electrical energy consumption. This is particularly burdensome as there is an ongoing effort to reduce the overall energy consumption of a vehicle, particularly in the case of an electric vehicle such as an autonomous vehicle.

SUMMARY

The disclosure seeks to overcome all or some of the disadvantages of the prior art by notably proposing an adjusting system that is simple to use, not very bulky, and of which the energy consumption for actuating it is not increased, or is even reduced.

In order to do this, a first aspect of the disclosure proposes a steering column sleeve comprising two elements consisting of an outer tube and an inner tube which are translationally mobile one with respect to the other along a reference axis and an adjusting system for adjusting the relative position between the two elements, the adjusting system comprising:

an axial-position adjusting screw extending along an axis of adjustment parallel to the reference axis and translationally secured to a first of the two elements, the screw being engaged with a nut fixedly secured to the second of the two elements so that a rotation of the screw about the axis of adjustment causes a translational movement of the nut with respect to the screw;

an adjusting device adjusting a resistive force that opposes the relative translational movement between the outer and inner tubes, the resistive-force adjusting device comprising at least a friction pad, supported by the first of the two elements, and a clamping surface secured to the second of the two elements and against which the friction pad is in bearing contact, the friction pad being able to move with respect to the clamping surface so as to vary the force with which the friction pad presses against the clamping surface, between a service position, in which a predetermined service pressure is applied by the friction pad to the clamping surface, and an adjusting position, in which an adjustment pressure lower than the service pressure is applied by the friction pad to the clamping surface,
the steering column sleeve being notable in that the system for adjusting the relative position between the two elements comprises a single motor for driving the rotation of the adjusting screw and controlling the resistive-force adjusting device, and in that it comprises a kinematic chain configured so that beyond a threshold resistive torque transmitted by the adjusting screw to the motor, the torque from the motor is transmitted to the resistive-force adjusting device so as to move the friction pad from its service position to its adjusting position.

Thanks to such a combination of features, a single motor is able to operate both the resistive-force adjusting device and the axial-position adjusting screw.

When the adjusting system is actuated to make an axial adjustment of the steering wheel along the reference axis, the motor generates a torque to rotate the adjusting screw with which the nut is meshed. This nut converts the rotational movement of the adjusting screw into an axial movement which corresponds to the movement for adjusting the steering wheel. However, when adjustment begins, the friction pads are applying a service pressure to the clamping surface, creating a resistive force. The motor therefore develops a significant torque and, beyond a threshold resistive torque for the driving of the adjusting screw, regardless as to whether or not the adjusting screw has begun to turn, the kinematic chain takes back at least a proportion of the motor torque of sufficient magnitude to transmit it to the resistive-force adjusting device and cause the friction pad to move from its service position, corresponding to a service position of the steering column sleeve, to its adjusting position. The movement of the pad decreases the resistive force between the two tubes, and this decreases the torque required to drive the adjusting screw, and therefore the resistive torque, thus allowing it to turn under less load and thus move the nut at the desired rate in order to ensure the relative axial adjustment of the two tubes. It will be noted that the adjusting system has a threshold value for the resistive torque of the adjusting screw beyond which value the kinematic chain is moved. In parallel, rotation of the adjusting screw occurs effectively onwards from a predetermined value of the motor torque for driving the adjusting screw which may be lower than or greater than the threshold resistive torque beyond which the kinematic chain is moved. In this way, the kinematic chain can be operated while the adjusting screw is already rotationally moved, or else when said adjusting screw has remained fixed. In practice, it will be noted that the two actions are performed in very short periods of time, less than a few seconds, so that the actions are near simultaneous.

According to one embodiment, the motor comprises a rotor which directly or indirectly drives the adjusting screw, and a stator secured to a casing of the motor in a pivoting connection with the adjusting screw so as to provide the axial positioning of the motor with respect to the adjusting screw, the kinematic chain and the adjusting device being configured so that beyond the threshold resistive torque of the adjusting screw on the motor, the casing of the motor is pivoted with respect to the axis of adjustment. In such a configuration, the casing of the motor forms at least one bearing, preferably two bearings, with the screw ensuring that the motor is correctly axially positioned. When the adjusting system is actuated to effect adjustment, the rotation of the screw is constrained by the driving of the nut, itself constrained by the resistive force of the two tubes with respect to one another. The reaction of the motor to the torque applied to the adjusting screw when the rotation of the rotor of the motor is constrained by said adjusting screw causes the stator to rotate.

In this case, the rotation of the stator with respect to the rotor is brought about when the torque of the motor for setting the adjusting screw in rotation is too high, namely higher than the predetermined threshold resistive torque. The rotation of the motor casing with respect to the adjusting screw is therefore a mechanical reaction associated with the design and the dimensioning of the kinematic chain itself. The dual control of the resistive-force adjusting device and the axial-position adjusting screw by the same motor therefore does not require complex specific electronic parameterization of the motor or the use of particular electronic sensors. Such a solution is therefore inexpensive and easy to implement.

According to one embodiment, the kinematic chain comprises a mechanical linkage for transmitting movement between the casing of the motor and a transmission mechanism which controls the resistive-force adjusting device. This movement-transmitting mechanical linkage makes it possible to react the torque of the motor that is brought about by the rotation of the motor casing.

According to one embodiment, the mechanical linkage for transmitting movement comprises two intermediate linkages, each of which is active and transmits movement in one given direction of rotation of the motor casing, the movement-transmitting mechanical linkage preferably comprising at least one dead-travel linkage configured to allow the casing of the motor to move without driving the transmission mechanism. Depending on the adjustment to be made, compressing or extending the two telescopic tubes one relative to the other, the rotor of the motor and the adjusting screw may be rotated in one direction or in the other. Such a dead-travel linkage is particularly advantageous when the movement-transmitting mechanical linkage is able to react the forces and transmit them along two parallel intermediate linkages, each one dedicated to a given direction of rotation. In this way, when one linkage is active the other does not disturb its action, thanks to the dead travel.

According to one embodiment, the kinematic chain comprises at least one elastic return member configured in such a way as to return the kinematic chain to a position of equilibrium, the position of equilibrium of the kinematic chain corresponding to the service position of the steering column sleeve, particularly of the resistive-force adjusting device and/or of the casing of the motor. In this way, the adjusting system is positioned back in the position of equilibrium which corresponds to the service position.

According to one embodiment, the movement-transmitting mechanical linkage comprises at least one link engaging with a pin of the casing of the motor, the link being connected to a lever, the lever driving the transmission mechanism. The lever preferably pivots about an axis that is fixed with respect to the first element and perpendicular to the reference axis so as to convert the movement of the links that is almost perpendicular to the axis of adjustment into a movement of a drive member that is almost parallel to the axis of adjustment, the drive member being, for example, a rack, driving the resistive-force adjusting device so as to move the friction pad.

According to one embodiment, the movement-transmitting mechanical linkage comprises two links each engaging with a distinct pin of the casing of the motor, the pins being substantially opposed with respect to the axis of adjustment of the adjusting screw. The two links connected to the motor casing by the pins react the torque generated by the motor during an adjustment, one of the links in the event of adjustment in the sense of compressing the two tubes and the other of the links in the event of adjustment of extending the two tubes.

According to one embodiment, each of the two links comprises a slot through which a pin passes so as to apply force to the link when an adjustment is made in one direction, and so as to move freely when an adjustment is made in the other direction. These slots allow force to be reacted by one link without being disturbed by the other during adjustment. In this way, and for a given direction of rotation, such slots allow a linkage whereby one of the links is driven by the motor casing and a linkage whereby the other of the links has a dead travel with respect to the motor casing.

According to one embodiment, the movement-transmitting mechanical linkage comprises at least one cable or cable strand, preferably two, each engaging with an interface of the casing of the motor. These cables offer the same functions as the links described above, one of the two cables being tensioned as the motor casing rotates in a direction providing driving of the lever according to the movement of the motor casing, and the other of the two cables being slack when it is not taut and providing a connection with dead travel so as not to disturb the action of the cable that is actuated and under tension.

According to one embodiment, the adjusting system comprises a plurality of, preferably two, resistive-force adjusting devices operated in parallel. In this way, the resistive-force adjusting devices are controlled together by the one single actuator, namely the motor, and preferably by the same kinematic chain. The adjusting system may be supplemented by one or more devices for applying a resistive force and which is (are) fitted with a pad which remains fixed between service (use) and adjustment. That simplifies the system and reduces costs because such a device with a fixed pad can be combined with a resistive-force adjusting device in which the friction pad is able to move with respect to the clamping surface so as to vary the force with which the friction pad presses against the clamping surface.

According to one embodiment, the resistive-force adjusting device comprises a cam bearing directly or indirectly against a bearing surface to generate a translational movement of the friction pad with respect to the clamping surface along a clamping axis that is fixed relative to the first of the two elements, so as to cause the force with which the friction pad presses against the clamping surface of the second of the two elements to vary between its service and adjusting positions.

According to one embodiment, the translational movement of the friction pad with respect to the clamping surface is parallel to the axis of clamping.

According to one embodiment, a first of the two members consisting of the bearing surface and the cam of the resistive-force adjusting device is fixed with respect to the first of the two elements consisting of the outer tube and the inner tube of the steering column sleeve, in the service position, and removable with respect to this first element.

According to one embodiment, a second of the two members consisting of the bearing surface and the cam comprises a plate. The plate is moved in rotation, directly or indirectly, by the kinematic chain connected to the motor.

According to one embodiment, the plate is secured to a drive arm extending axially with respect to the axis of clamping and configured to drive the plate in rotation. The use of a drive arm allows at least part of the kinematic chain, notably the transmission mechanism, to be offset to outside the sleeve of the column, thereby simplifying design and manufacture.

According to one embodiment, the mobile plate of the second of the two members comes to bear directly or indirectly against the first of the two members consisting of the bearing surface and the cam, the two members being configured in such a way that rotation of the plate about the axis of clamping in a forward direction causes said plate to move axially in a first direction, and rotation of the plate about the axis of clamping in a backward direction causes said plate to move axially in a second direction which is the opposite of the first direction.

According to one embodiment, the adjusting mechanism comprises rolling bodies arranged between the two members consisting of the bearing surface and the cam, each of the two members comprising raceways to guide at least one of the rolling bodies. Such a feature makes it possible to limit the friction internal to the system and thereby reduce the actuator power and/or energy consumption needed for actuating the mechanism.

According to one embodiment, the axis of clamping of the resistive-force adjusting device is arranged perpendicularly, preferably radially, with respect to the reference axis of translational movement of the two elements consisting of the outer tube and the inner tube of the steering column sleeve which are capable of translational movement one relative to the other.

BRIEF DESCRIPTION OF THE DRAWINGS

Other features and advantages of the disclosure will become apparent from reading the following description, with reference to the attached figures which illustrate.

For greater clarity, elements that are identical or similar are identified by identical reference signs across all the figures.

DETAILED DESCRIPTION

Figure 1:
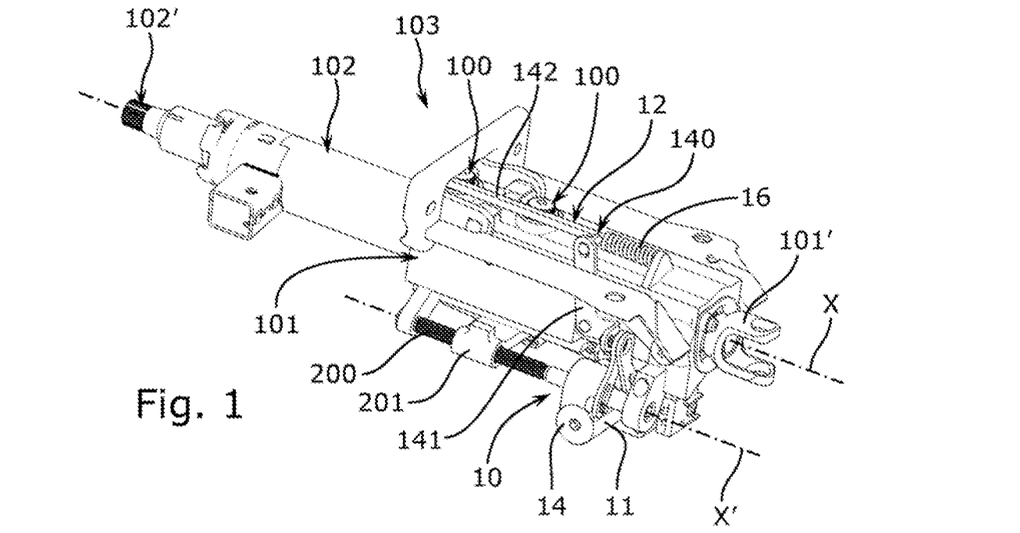
FIG. 1: a perspective view of part of a steering column according to one embodiment.
Figure 2:
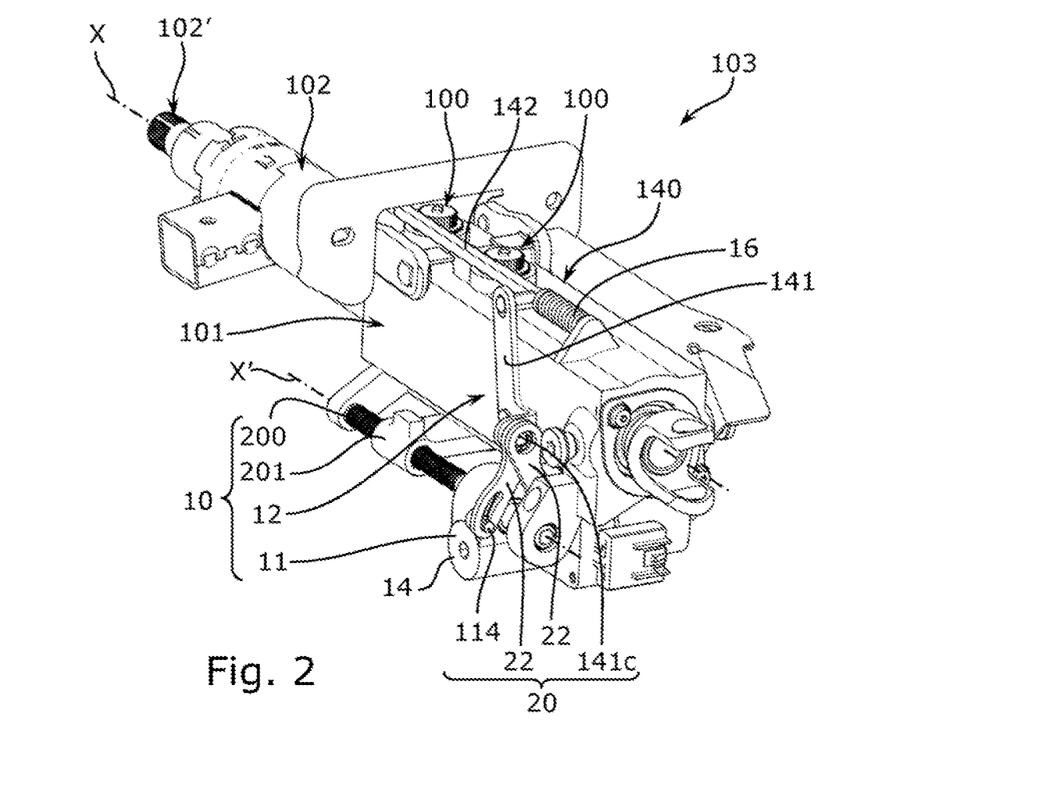
FIG. 2: another perspective view of part of a steering column according to this embodiment.
Figure 3:
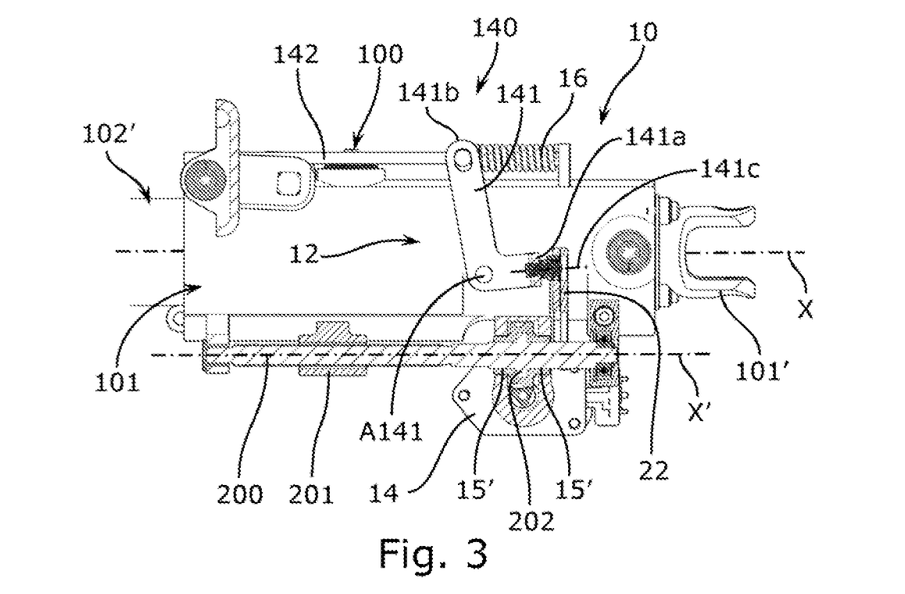
FIG. 3: a view in cross section of a detail of FIG. 2.

FIGS. 1 and 2 illustrate two perspective views of part of a steering column for an automobile such as a car, equipped with a sleeve 103. The sleeve 103 of the steering column is of the type comprising a telescopic system involving two tubes 101, 102, an outer tube 101 and an inner tube 102 which is configured to move translationally inside the outer tube 101 along a reference axis X. The steering column comprises a shaft, such as a steering shaft, guided in the sleeve 103 and having a distal end 102' configured to be connected directly or indirectly to a steering wheel (not illustrated). Another end 101' of the shaft for its part has an interface such as a universal joint acting as an angle transmission for rotating a pinion meshing with a steering rack (not illustrated). A user is able to adjust the steering wheel for reach, notably thanks to the translational movement of the inner tube 102 with respect to the outer tube 101 of the sleeve 103.

To drive and guide this translational movement, an adjusting system 10 is equipped with an adjusting screw 200 for adjusting the relative axial position of the tubes 101, 102 extending along an axis of adjustment X' parallel to the reference axis X and which is mounted on two bearings connected to the outer tube 101 which is fixed during axial adjustment. The adjusting screw 200 meshes with a nut 201 fixedly secured to the inner tube 102 so that a rotation of the screw 200 about its axis of adjustment X' causes the nut 201 to move translationally with respect to the screw 200 parallel to the reference axis X.

Figure 6:
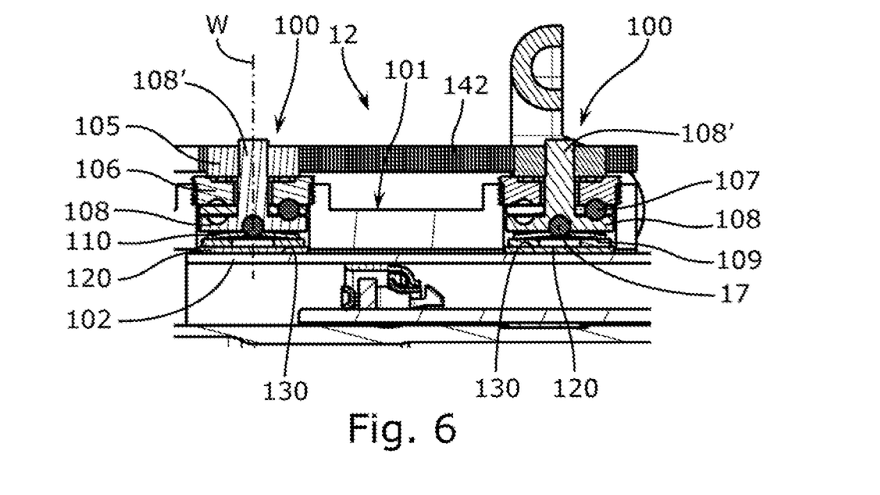
FIG. 6: a view in cross section of the devices for adjusting a resistive force opposing the relative translational movement of the outer and inner tubes, according to this embodiment.

In order to cover the operating clearance and ensure the connection of the two tubes 101, 102 relative to one another a minimum of stiffness in the service position, the sleeve 103 of the steering column is equipped with at least one friction pad 120 supported by the outer tube 101 and configured to come into bearing contact with a clamping surface 130 of the inner tube 102 (see FIG. 6). In that service position, the system is configured so that a predetermined service pressure is applied by the friction pad 120 borne by the outer tube 101 to the clamping surface 130 of the inner tube 102. Such pressure from the friction pad 120 is aimed at increasing a resistive force to oppose the relative translational movement between the two elements consisting of the outer tube 101 and the inner tube 102. In this embodiment, the adjusting system 10 comprises two friction pads 120.

The axial-position adjusting system 10 comprises two resistive-force adjusting devices 100 allowing the associated friction pad 120 a translational movement at least between its service position and an adjusting position in which the pressure of the friction pad 120 against the clamping surface 130 is reduced in comparison with the service position. It is then possible to achieve high rates of adjustment between the two tubes 101, 102, thus avoiding the overrating of motors generating the relative movement of the two tubes 101, 102.

Figure 4A:
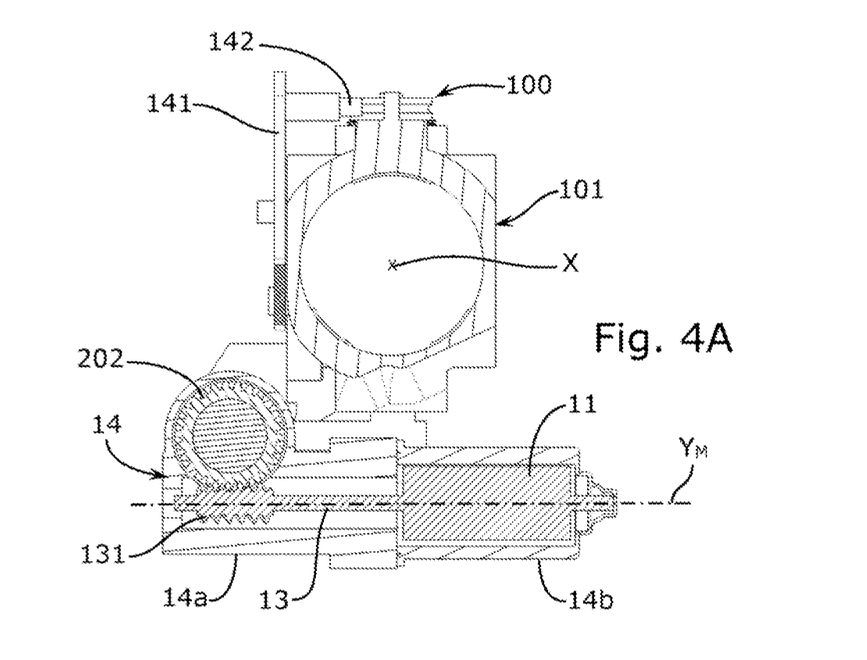
FIG. 4A: a view in cross section of a motor with respect to the adjusting screw in a service position of equilibrium according to this embodiment.

In order to drive the rotation of the adjusting screw 200, the system 10 for adjusting the relative position between the two elements 101, 102 comprises a motor 11. The motor 11 comprises a motor shaft forming a rotor 13 which directly or indirectly drives the adjusting screw 200. In particular, in this embodiment, the motor shaft 13 is equipped with reduction gear of the worm 131 type (see FIG. 4A) this worm meshing with a toothed wheel 202 borne by a body of the adjusting screw 200. The assembly formed by the motor 11 and the reduction gear or gears, also referred to as geared motor unit, is housed in a casing 14 of the geared motor unit. The stator of the motor 11 is fixedly secured to this casing 14, forming a kinematically connected assembly. The word "casing" is to be understood here in the broad sense as meaning a mechanical closure surrounding all or part of an assembly. The stator of the motor 11 here is enclosed in a first casing 14b which is itself housed in part in and/or fixed in a complementing manner to, a second casing 14a housing all or part of the reduction gear mechanism (see FIG. 4A) the whole assembly forming the casing 14 of the geared motor unit.

The casing 14 of the geared motor unit 11, particularly the second casing 14a housing the reduction gear mechanism 131, is in a pivoting connection 15 with the adjusting screw 200 so as to ensure the axial positioning of the motor 11 with respect to the adjusting screw 200. More specifically, the casing 14 has two interfaces, axially one on each side of the toothed wheel 202 with respect to the axis of adjustment X', which interfaces each form a bearing 15' with the adjusting screw 200.

The same motor 11 is also configured to operate the resistant-force adjusting device 100, particularly the friction pads 120. To do that, the adjusting system 10 comprises a kinematic chain 12 configured so that beyond a threshold torque resisting the driving of the adjusting screw 200, enough torque from the motor 11 is transmitted to the resistant-force adjusting device 100 to move the friction pad 120 from its service position toward its adjusting position.

Figure 4B:
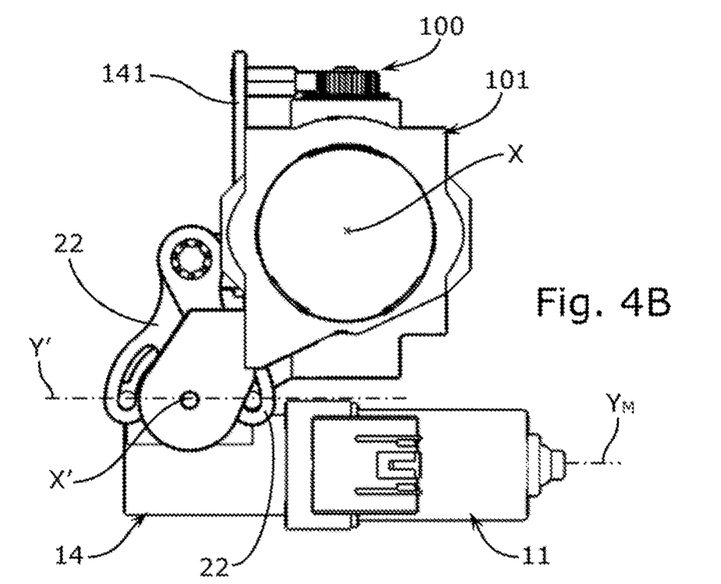
FIG. 4B: a view of a service position of equilibrium of a motor with respect to the adjusting screw according to this embodiment.

At the time that adjustment begins, the adjusting system 10 is in a state of equilibrium, corresponding to a service position (see FIGS. 4A, 4B) in which the friction pads 120 borne by the outer tube 101 are applying a service pressure to the clamping surface 130 of the inner tube 102 to oppose relative translational movement of these tubes. During adjustment, the motor 11 is operated for turning the adjusting screw 200. This rotation of the motor shaft 13 transmits a torque to the adjusting screw 200 which itself transmits a torque to the nut 201. Because of the pressure applied by the friction pads, the motor torque is not enough to drive the rotation of the clamping screw 200 at the desired speed and will increase up to a predetermined threshold value beyond which the reaction of the adjusting system 10 to this torque is for the stator to rotate with respect to the rotor 13 then constrained by the screw. Specifically, because the toothed wheel 202 is substantially constrained in its rotation, namely beyond the threshold resistive torque transmitted by the adjusting screw 200 to the motor 11, efforts made by the motor 11 to make the rotor 13 rotate have the effect of causing the stator, and therefore the casing 14 of the motor 11, to pivot about the axis of adjustment X' and by virtue of the bearings 15' that form a pivot connection 15. The torque of the motor 11 is then reacted by the kinematic chain 12, in part as far as a position of equilibrium in which the torque is then completely absorbed. This pivoting as far as an angle of plus or minus α, comprised between 10 and 40 degrees and illustrated in FIGS. 4C and 4D: the direction of rotation of the casing being dependent on the direction of rotation of the rotor according to whether the adjustment that is to be made corresponds to a compressing or an extending of the relative axial position of the two tubes 101, 102.

The pivoting of the casing 14 of the motor 11 about the axis of adjustment X' is therefore brought about when the torque from the motor 11 reaches a value higher than a threshold value that is predetermined according to the design of the kinematic chain and according to the sizing of the components thereof. This movement of the casing 14 of the motor 11 is then reacted by the associated kinematic chain 12 so that the resistive-force adjusting device 100 can be operated in such a way as to move each friction pad 120 from its service position to its adjusting position.

When the friction pads 120 are in the adjusting position, the pressure that said friction pads 120 apply to the clamping surface 130 is reduced in comparison with the service position, thus reducing the resistive force that opposes the relative translational movement of the inner 102 and outer 101 tubes. This reduction in the clamping force, and therefore in the resistive torque of the adjusting screw 200 on the motor 11 has the effect of increasing the speed at which the motor shaft formed by the rotor 13 rotates and, as a consequence, of increasing the rate of adjustment.

This reduced clamping force also leads to a lower torque on the adjusting screw 200, and this reduces the torque generated by the geared motor unit. The reaction of the geared motor unit on the kinematic chain 12 is thereby also reduced, generating an increase in the force of the friction pads 120 on the associated clamping surfaces 130. Equilibrium between these various forces becomes established and leads to the steering wheel adjustment being performed at a higher rate than if the reaction of the geared motor unit were reacted by the fixed structure of the steering column sleeve 103.

More specifically, the kinematic chain 12 comprises a mechanical linkage 20 transmitting movement between the casing 14 of the motor 11 and a transmission mechanism 140 which operates the resistive-force adjusting device 100.

In the example illustrated in FIGS. 1 to 6, the movement-transmitting mechanical linkage 20 comprises two links 22, each engaging with a pin 114 of the casing of the motor 11. The two links 22 connected to the geared motor unit by the pins 114 react the torque generated by the motor 11 during an adjustment, one of them in the case of adjustment in the sense of compression (FIG. 4C) and the other in the event of adjustment in the sense of extension (FIG. 4D) according to the direction of rotation of the adjusting screw 200 and therefore to the direction of rotation of the motor shaft 13.

The links 22 are connected to the one same lever 141. Each link 22 comprises at a proximal end 22a, an open hole 22c able to collaborate with a pin 141c of the lever 141 positioned at a first end 141a so as to be able to pivot about same. Each link 22 also comprises a slot 24 through which one of the two distinct pins 114 passes and which pins are secured to the motor casing so as to apply a force to the link 22 when an adjustment is made in one direction and so as to move freely when an adjustment is made in the other direction. The pins 114 are oriented in directions parallel to the axis of adjustment X' of the adjusting system 10. The pins 114 are positioned on the casing 14 so that they are substantially opposed one with respect to the other about the axis of adjustment X'. As is visible for example in FIG. 4B, the pins 114 are positioned such as to be aligned together with the axis of adjustment X' along a straight line Y' parallel to an axis of the geared motor unit $Y_M$ corresponding to the axis of rotation of the rotor 13 thereof.

Figure 4C:
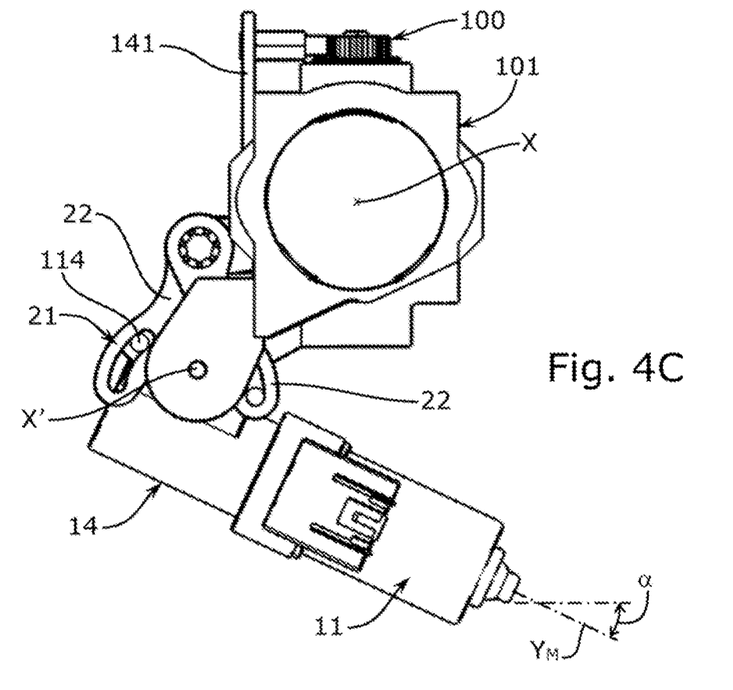
FIG. 4C: a view of an adjusting position of a motor with respect to the adjusting screw, in the sense of an adjustment whereby the two, inner and outer, tubes of the steering column sleeve according to this embodiment are being adjusted by compressing them.
Figure 4D:
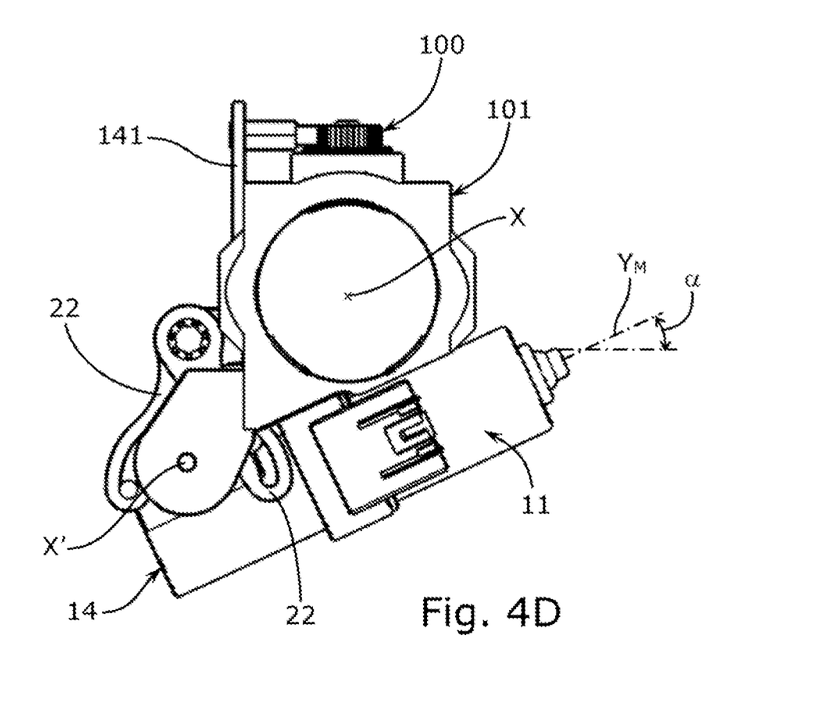
FIG. 4D: a view of an adjusting position of a motor with respect to the adjusting screw, in the sense of an adjustment whereby the two, inner and outer, tubes of the steering column sleeve according to this embodiment are being adjusted by extending them.
Figure 5:
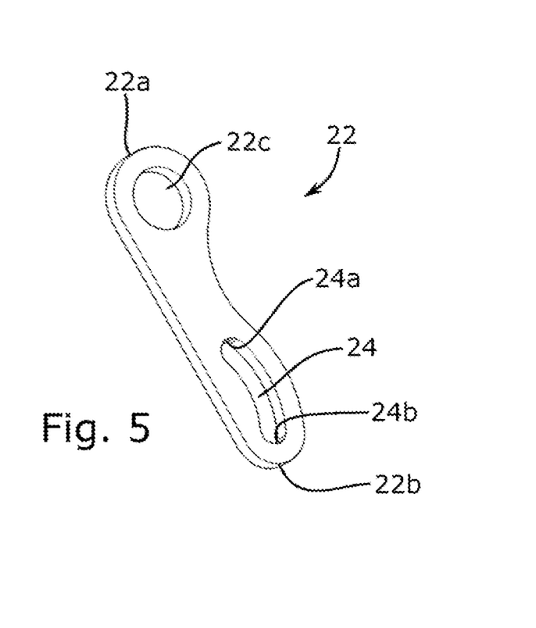
FIG. 5: a view of a link according to one embodiment.

Each of the links 22 extends on each side of the axis of rotation X' of the geared motor unit. The slots are of curved elongate shape, extending along a portion of a circular curve centered with respect to the axis of rotation X' so that the pins 114 can slide along these slots 24 as the casing 14 pivots. It will be noted that these elongate shapes may vary, for example may present a rectilinear portion. In the service position, corresponding to a state of equilibrium (see FIGS. 4A and 4B), each of the pins 114 is situated at a distal end 24b of the slot 24 directed toward the side of the distal end 22b of the associated link 22, which is the opposite end to its proximal end 22a. As the casing 14 of the motor 11 rotates to move from a service position to an adjusting position, the pins 114 are pivoted together in the one same direction of rotation (see FIGS. 4C and 4D). During this movement:

a first of the two pins 114 bears against a distal end 24b of the associated slot 24 and in its travel drives the corresponding link 22 which is active in the transmission of force to the resistive-force adjusting mechanism 100; whereas a second of the two pins 114 is free to continue its travel along the slot 24 from its distal end 24b toward its proximal end 24a so that its movement has no effect on the associated link 22 and is passive in the transmission of force to the resistive-force adjusting mechanism 100.

In this way, each of the links 22 forms with the casing 14 of the motor 11 an intermediate linkage each of which is configured to be active and to transmit movement in one of the two directions of rotation of the casing 14 so that when one intermediate linkage is active in transmitting the movement, the other linkage is a dead-travel linkage 21 configured to allow the casing 14 of the motor 11 to move without driving the transmission mechanism 140. In this particular instance, the slot 24 of each of the links 22 allows a link 22 that is active in the transmission to react force without being disturbed by the other link which is passive because of its dead-travel connection.

The two links 22 are connected to the lever 141 which pivots about a transverse axis $A_{141}$ perpendicular to the reference axis X of the sleeve 103 of the steering column and converts the movement of the links 22, which is near perpendicular with respect to the axis of adjustment X', in this instance near vertical, into a movement of a member that is almost parallel with respect to the reference axis X, such as a rack 142, driving the resistive-force adjusting device 100 in order to make the friction pad 120 move.

The lever 141 has a second end 141b, the opposite end to the first end 141a, which is configured to drive a rack 142 meshing with two toothed wheels 105 of two resistive-force adjusting devices 100 mounted in parallel so as to make their respective friction pad 120 move.

The adjusting system 10 comprises an elastic return member 16 configured to return the kinematic chain to a position of equilibrium, the position of equilibrium corresponding to the service position of the resistive-force adjusting device 100 and of the casing 14 of the motor 11. That means that once the friction pads 120 are in the adjusting position, it is possible to find a good state of equilibrium between the various forces, notably equilibrium in the distribution of motor torque between, on the one hand, the driving of the adjusting screw 200 and, on the other hand, the maintaining of the resistive-force adjusting devices 100 in an adjusting position. The elastic return member 16 also allows the adjusting system to be returned to a configuration of equilibrium once the adjustment has been completed, namely when the motor stops producing torque.

The spring 16 can be positioned to constrain the rack 142 in an opposite direction to the direction of travel brought about by the lever 141, the spring pushing on the rack 142. It will be noted that this spring 16, or an additional spring, can also be positioned at the lever 141, being for example a torsion spring. The spring 16 is rated so that the sum of the forces brings the system into a position of equilibrium corresponding to the service position.

FIG. 6 illustrates the two clamping-force adjusting devices 100. Each of the two devices 100 comprises a bearing surface 106 having an annular body provided on its exterior radial surface with a radial screw thread running coaxially with respect to the clamping axis W and configured to collaborate with a tapped hole in the outer tube 101. Thus, the bearing surface 106 can be fixed to the outer tube 101 by simply screwing the clamping-force adjusting device 100 into the tapped hole in the outer tube 101 which is provided for that purpose. This screwing allows the clamping-force adjusting device 100 to be fixed in the service position with respect to the clamping surface 130. Such adjustment of the service position with predetermined pressure is generally performed at the factory by an operator acting on an interface configured to ensure that a torque and/or an angle is applied.

Each of the two devices 100 also comprises a cam 108 bearing directly or indirectly on the bearing surface 106 to generate a translational movement of the friction pad 120 with respect to the clamping surface 130 along the axis of clamping W that is fixed with respect to the first 101 of the two elements 101, 102, so as to vary the force with which the friction pad 120 presses against the clamping surface 130 of the second of the two elements 101, 102 (in this instance the inner tube 102) between its service and adjusting positions.

The cam 108 comprises a plate secured to a drive arm 108' extending axially with respect to the clamping axis W. The drive arm 108' passes through a central orifice in the component secured to the outer tube 101, namely in this case the bearing surface 106, and projects outward so as to engage in a complementary open hole in the drive wheel 105 operated by the transmission mechanism 140. The cam has inclined camways in which rolling bodies such as balls 107 roll in order to vary the relative distance between the cam 108 and the bearing surface 106 to generate a proportional variation in the pad clamping force.

Each of the two devices 100 also comprises a spring washer 110 positioned between the cam plate 108 and the friction pad 120 and positioned coaxially with respect to the clamping axis W. The spring washer 110 creates a pressure force dependent on its compression. A central ball transmits the movement of the cam 108 to the spring washer 16. The small contact surfaces of the ball 17 make it possible to have a low friction torque as the cam plate 108, here forming a cam 11, rotates.

A flat load-spreading (optional) washer 109, centered on the clamping axis W is interposed between the spring washer 110 and the friction pad 120 so as to spread the load of the spring washer 110 over the surface of the friction pad 120.

The friction pad 120 rubbing on the clamping surface 130 of the inner tube 102 is made from a thermo-plastic material with the possibility of a lubricating filler being incorporated into it. The friction pad 120 may also be made from a metallic material such as sintered bronze for example.

Figure 7:
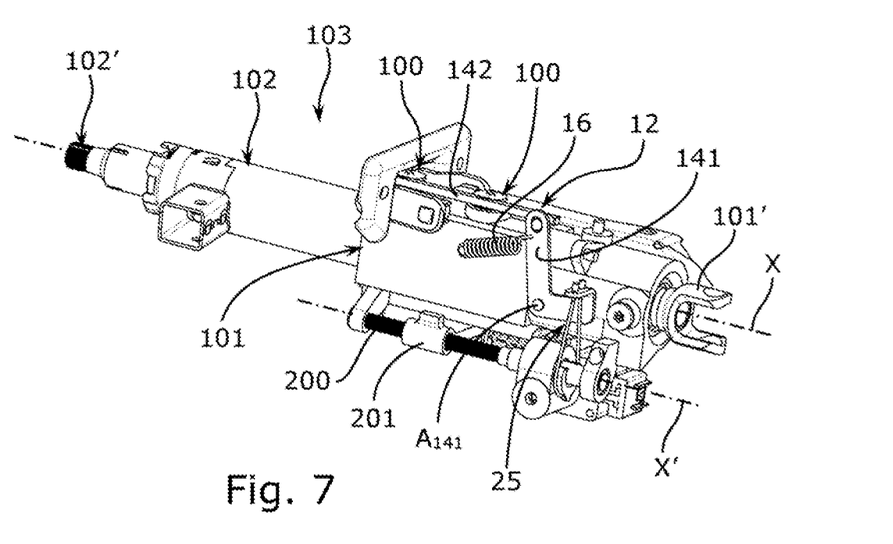
FIG. 7: a perspective view of part of a steering column according to another embodiment.

FIG. 7 illustrates another embodiment in which the kinematic chain 12 is modified.

In particular, this embodiment differs from the embodiment described previously chiefly in that the movement-transmitting mechanical linkage 20 comprises at least one cable 25, in this instance one, engaging with an interface of the casing 14 of the motor 11. Two strands of the cable 25 form an intermediate linkage in the same way as the links 22, which amounts to replacing the links 22 with one or more cables 25 or strands of cable 25, one of the strands of cable 25 sliding in a hole in the lever 141 and/or deforming when the other transmits force to the lever 141.

Each of the strands of cable 25 forms with the casing 14 of the motor 11 an intermediate linkage each of which is active and transmits movement in a given direction of rotation of the casing 14 of the motor 11 and which is distinct from the other strand of cable 25 so that when one intermediate linkage is active in transmitting the movement, the cable being taut, the other linkage is a dead-travel linkage 21 configured to allow the casing 14 of the motor 11 to move without driving the transmission mechanism 140, corresponding to the strand of cable 25 being slack or not taut. In this particular instance, the tension in one of the two strands of cable 25 allows the force of the casing to be taken up by the lever 141 which is active in transmitting movement without being disturbed by the other of the two strands of cable 25 which is passive in the transmission of force owing to its dead-travel connection when said strand of cable 25 slides in a hole in the lever and/or relaxes, deforming to form a loop, depending on the stiffness of the strand of cable 25.

Each strand of cable 25 has a first end secured to the lever 141 and an opposite second end secured to the casing 14 of the motor 11. This fixing of the strands of cable 25 to the casing 14 may be performed in the same way as for the links 22 or, as illustrated in FIG. 7, may be performed at an anchor point, which may or may not be the same point, opposite the axis of adjustment X' with respect to the transmission lever 141.

In this embodiment, a spring 16 is positioned in such a way as to constrain the rack 142 in an opposite direction to the direction brought about by the lever 141, the spring pushing the rack 142. The spring 16 in this instance is positioned between, or even interposed between, the lever 141 and a fixed part or a framework of the outer tube 101. The spring 16 is rated so that the sum of the forces leads the system into a position of equilibrium corresponding to the service position.

Figure 8:
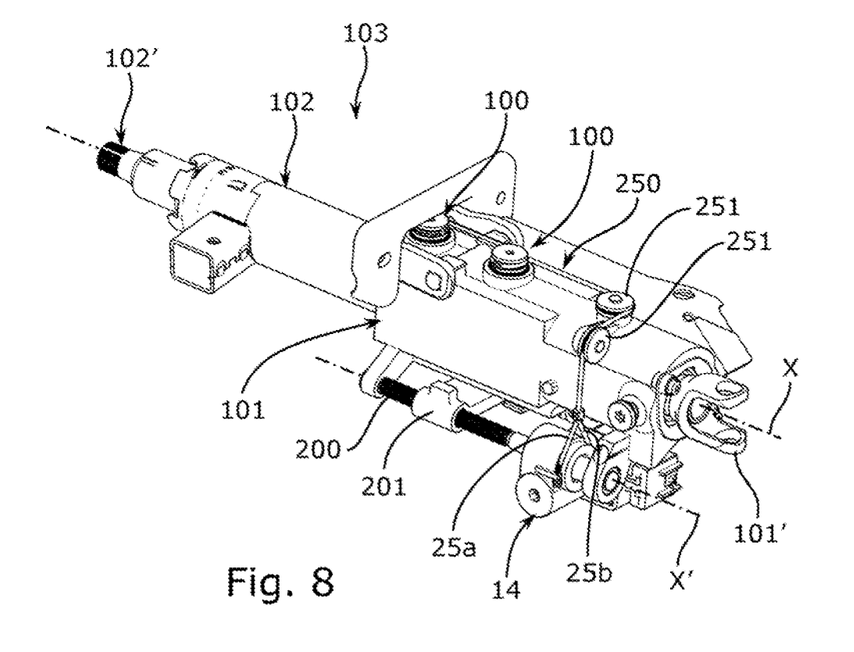
FIG. 8: a perspective view of part of a steering column according to another embodiment.

FIG. 8 illustrates another embodiment in which the kinematic chain 12 is different.

This embodiment essentially differs from the previous embodiments in that the links 22 and also the lever 141, are replaced by cables 250 acting directly on the device or devices 100 that adjust the resistive force that opposes the relative translational movement of the outer 101 and inner 102 tubes and allows the force of the friction pads 120 on the clamping surfaces 130 to be varied. Angle transmissions 251 formed by idler wheels provide guidance for the cable(s).

More specifically, in this embodiment, the kinematic chain 12 comprises a mechanical linkage 20 for transmitting the movement of the casing 14 and comprising two strands of cable 25 comparable to the embodiment of FIG. 7. However, there is a difference in the way the dead travel or idling travel is achieved in that the two strands of cable 25 may slide through a hole, or space, delimited in retaining tabs secured to the casing 14 and/or may relax and deform to form a loop, depending on the stiffness of the strand of cable 25. The kinematic chain 12 further comprises a transmission mechanism 140 which operates the resistive-force adjusting device 100 equipped with at least one cable or bundle of cables 250 which is connected on the one hand with the resistive-force adjusting device or devices 100 and, on the other hand, with the strands of cable 25 of the mechanical linkage 20 transmitting the movement of the casing 14.

It will be noted that all or part of the cable(s) may be housed inside one or more sheath(s). These sheaths serve to protect and/or to guide the cable.

The adjusting system 10 comprises an elastic return member 16 configured to return the kinematic chain 12 to a position of equilibrium, the position of equilibrium corresponding to the service position of the resistive-force adjusting device 100 and of the casing 14 of the motor 11. In this embodiment, the elastic return means 16 may be formed by torsion springs (not visible) positioned at least at some of the angle transmissions 251.

Naturally, the disclosure is described in the foregoing by way of example. It must be appreciated that the person skilled in the art can produce various alternative forms of embodiment of the disclosure without thereby departing from the scope of the disclosure.

The invention claimed is:

1. A steering column sleeve comprising (i) two elements that include an outer tube and an inner tube which are translationally mobile one with respect to the other along a reference axis, and (ii) an adjusting system for adjusting a relative position between the two elements, the adjusting system comprising:
    an axial-position adjusting screw extending along an axis of adjustment parallel to the reference axis and translationally secured to a first of the two elements, the adjusting screw being engaged with a nut fixedly secured to a second of the two elements so that a rotation of the adjusting screw about the axis of adjustment causes a translational movement of the nut with respect to the adjusting screw;
    a resistive-force adjusting device configured to adjust a resistive force that opposes relative translational movement between the outer tube and the inner tube, the resistive-force adjusting device comprising at least (i) a friction pad supported by the first of the two elements, and (ii) a clamping surface secured to the second of the two elements and against which the friction pad is in bearing contact, the friction pad being configured to move with respect to the clamping surface so as to vary a force with which the friction pad presses against the clamping surface between a service position in which a predetermined service pressure is applied by the friction pad to the clamping surface, and an adjusting position in which an adjustment pressure lower than the service pressure is applied by the friction pad to the clamping surface,
    wherein the adjusting system further comprises (i) a motor configured to drive rotation of the adjusting screw and control the resistive-force adjusting device, and (ii) a kinematic chain configured so that beyond a threshold resistive torque transmitted by the adjusting screw to the motor, torque from the motor is transmitted at least in part to the resistive-force adjusting device so as to move the friction pad from its service position to its adjusting position.

2. The steering column sleeve as claimed in claim 1, wherein the motor comprises a rotor configured to directly or indirectly drive the adjusting screw, and a stator secured to a casing of the motor in a pivoting connection with the adjusting screw so as to provide axial positioning of the motor with respect to the adjusting screw, the kinematic chain and the adjusting device being configured so that beyond the threshold resistive torque, the casing of the motor is pivoted with respect to the axis of adjustment.

3. The steering column sleeve as claimed in claim 2, wherein the kinematic chain comprises an elastic return member configured in such a way as to return the kinematic chain to a position of equilibrium, the position of equilibrium corresponding to the service position of the resistive-force adjusting device and/or of the casing of the motor.

4. The steering column sleeve as claimed in claim 1, wherein the kinematic chain includes a mechanical linkage configured to transmit movement between a casing of the motor and a transmission mechanism which controls the resistive-force adjusting device.

5. The steering column sleeve as claimed in claim 4, wherein the mechanical linkage comprises two intermediate linkages, each of which is active and configured to transmit movement in one given direction of rotation of the casing of the motor.

6. The steering column sleeve as claimed in claim 5, wherein the mechanical linkage includes at least one dead-travel linkage configured to allow the casing of the motor to move without driving the transmission mechanism.

7. The steering column sleeve as claimed in claim 4, wherein the mechanical linkage comprises at least one link engaging with a pin of the casing of the motor.

8. The steering column sleeve as claimed in claim 7, wherein the mechanical linkage comprises two links each engaging with a respective pin of a number of pins of the casing of the motor, the number of pins being substantially opposed with respect to the axis of adjustment.

9. The steering column sleeve as claimed in claim 8, wherein each of the two links comprises a slot through which the respective pin passes so as to apply force to the respective link when an adjustment is made in one direction, and so as to move freely when an adjustment is made in the other direction.

10. The steering column sleeve as claimed in claim 7, wherein the link is connected to a lever to drive a rack meshing with the resistive-force adjusting device so as to move the friction pad.

11. The steering column sleeve as claimed in claim 4, wherein the mechanical linkage comprises at least one cable configured to engage with an interface of the casing of the motor.

12. The steering column sleeve as claimed in claim 4, wherein the mechanical linkage comprises two cables engaging with an interface of the casing of the motor.

13. The steering column sleeve as claimed in claim 1, wherein the adjusting system (10) comprises an additional resistive-force adjusting device configured to operate in parallel with the resistive-force adjusting device.

14. The steering column sleeve as claimed in claim 1, wherein the resistive-force adjusting device comprises a cam bearing directly or indirectly against a bearing surface to generate a translational movement of the friction pad with respect to the clamping surface along a clamping axis that is fixed relative to the first of the two elements, so as to cause the force with which the friction pad presses against the clamping surface of the second of the two elements to vary between its service position and its adjusting position.

* * * * *